United States Patent

Gruss et al.

[11] Patent Number: 5,869,546
[45] Date of Patent: Feb. 9, 1999

[54] MIXTURES LEADING TO HARD POLYURETHANE FOAMED MATERIALS

[75] Inventors: Peter Gruss; Manfred Kapps, both of Bergisch Gladbach; Peter Vehlewald, Leichlingen; Rainer Rettig, Kürten, all of Germany

[73] Assignee: Bayer Aktiengesellschaft, Leverkusen, Germany

[21] Appl. No.: 714,157

[22] PCT Filed: Mar. 31, 1995

[86] PCT No.: PCT/EP95/01207

§ 371 Date: Sep. 20, 1996

§ 102(e) Date: Sep. 20, 1996

[87] PCT Pub. No.: WO95/28430

PCT Pub. Date: Oct. 26, 1995

[30] Foreign Application Priority Data

Apr. 13, 1994 [DE] Germany .......................... 44 12 639.5
May 11, 1994 [DE] Germany .......................... 44 16 623.0

[51] Int. Cl.[6] ................................................. C08G 18/00
[52] U.S. Cl. ............................ 521/159; 521/130; 521/131
[58] Field of Search ................................ 521/159, 130, 521/131; 528/59

[56] References Cited

U.S. PATENT DOCUMENTS 4,061,662 12/1977 Marans et al. .
4,645,630 2/1987 Rasshofer et al. ......................... 264/54
5,502,147 3/1996 Nodelman et al. ....................... 528/49
5,502,150 3/1996 Steppan et al. ........................... 528/60

FOREIGN PATENT DOCUMENTS 2052227  3/1992  Canada .
2082964  5/1993  Canada .
210566   2/1987  European Pat. Off. .
345580  12/1989  European Pat. Off. .
3017298 11/1981  Germany .
4038401  6/1992  Germany .

Primary Examiner—John M. Cooney, Jr.
Attorney, Agent, or Firm—Joseph C. Gil; N. Denise Brown

[57] ABSTRACT

Mixtures leading to hard polyurethane foamed materials, which mixtures are preferably present in a pressure vessel, contain a) prepolymers containing isocyanate groups, obtainable by the reaction of polyisocyanates containing isocyanurate groups and optionally urethane groups with compounds having at least two hydrogen atoms which are reactive to isocyanates and having a molecular weight of 62 to 10,000, wherein the content of monomeric polyisocyanate in the prepolymer is less than 2 weight %, b) auxiliary process materials and additives known in the art, and c) foaming agents having a boiling point less than 0° C./760 mm Hg.

10 Claims, No Drawings

MIXTURES LEADING TO HARD POLYURETHANE FOAMED MATERIALS

This application is 35 USC 371 filing of PCT/EP95/01207 filed Mar. 31, 1995, published as WO95/28430 Oct. 26, 1995.

It is known that single-component and two-component polyurethane foamed materials can be produced by reacting mixtures of polyols, foam stabilizers, plasticizers, flame-retardants, accelerators and other process additives, in excess, with di- and/or polyisocyanates in the presence of liquefied foaming gases to form prepolymers containing free isocyanate groups. This reaction is usually conducted in pressure vessels, e.g. in aerosol cans, or (for two-component foamed materials) in unpressurized two-compartment vessels.

When a mixture leading to a single-component foam is discharged, the reaction mass swells due to the volatilization of the foaming agent (frothing). The final foam is obtained by reaction with moisture (e.g. ambient moisture). This can be used in various ways, e.g. for filling and fixing purposes (e.g. for the installation of door frames). When two-component foam systems are used, the mixture is generally cured by reaction with compounds containing at least two active hydrogen atoms as crosslinking agents. Examples of crosslinking agents which are suitable for this purpose include water and/or organic hydroxyl and/or amino compounds.

Surprisingly, it has now been ascertained that by conjointly using special polyisocyanate prepolymers, it is possible firstly to keep the content of monomeric polyisocyanate low (as is also required by legislation), and secondly to obtain hard polyurethane foamed materials having excellent properties for practical application.

The present invention relates to mixtures leading to hard polyurethane foamed materials which mixtures are preferably present in a pressure vessel, and which contain a) prepolymers containing isocyanate groups, obtainable by the reaction of polyisocyanates containing isocyanurate groups and optionally urethane groups with compounds having at least two hydrogen atoms which are reactive to isocyanates and having a molecular weight of 62 to 10,000, wherein the content of monomeric polyisocyanate in the prepolymer is less than 2 weight %, b) auxiliary process materials and additives known in the art, and c) foaming agents having a boiling point less than 0° C./760 mm Hg.

According to the invention, it is preferred that the content of isocyanurate groups in the prepolymer is at least 3 weight %, an aliphatic and/or cycloaliphatic polyisocyanate is used as the polyisocyanate containing isocyanurate groups and optionally urethane groups, isophorone diisocyanate is used as the polyisocyanate containing isocyanurate groups and optionally urethane groups, hexamethylene diisocyanate is used as the polyisocyanate containing isocyanurate groups and optionally urethane groups, a mixture of an aliphatic and an aromatic polyisocyanate is used as the polyisocyanate containing isocyanurate groups and optionally urethane groups, a toluene diisocyanate, the isocyanurate group content of which is at least 3 weight %, is used as the polyisocyanate containing isocyanurate groups and optionally urethane groups, tetrafluoroethane, difluoroethane, dimethyl ether, propane, butane, carbon dioxide or nitrous oxide, optionally in combination, are used as the foaming agent.

The present invention also relates to hard polyurethane foamed materials obtainable by the curing of the mixtures according to the invention by the action of moisture after their emergence from a pressure vessel ("single-component foamed materials"), or obtainable by the curing of the mixtures by reaction with compounds containing reactive hydrogen atoms and having a molecular weight from 18 to 6000 as crosslinking agents ("two-component foamed materials"). These crosslinking agents are known in the art and may comprise water or organic compounds of ethylene glycol, butanediol or trimethylolpropane, for example.

The starting components for the prepolymers a) to be used according to the invention are:

1) aliphatic, cycloaliphatic, araliphatic, aromatic and heterocyclic polyisocyanates containing isocyanurate groups and optionally urethane groups. The isocyanate starting materials which are to be modified by isocyanurate groups and optionally by urethane groups are described, for example, by W. Siefken in Justus Liebigs Annalen der Chemie, 562, pages 75 to 136, and comprise those of formula $Q(NCO)_n$, for example, where n=2–4, preferably 2 or 3, and Q represents an aliphatic hydrocarbon radical containing 2–18 C atoms, preferably 6–10 C atoms, a cycloaliphatic radical containing 4–15 C atoms, preferably 5–10 C atoms, an aromatic hydrocarbon radical containing 6–15 C atoms, preferably 6–13 C atoms, or an araliphatic hydrocarbon radical containing 8–15 C atoms, preferably 8–13 C atoms, e.g. polyisocyanates such as those described in DE-OS 28 32 253, pages 10–11. Aliphatic and/or cycloaliphatic polyisocyanates are particularly preferred, preferably isophorone diisocyanate and hexamethylene diisocyanate, and in addition toluene 2,4- and/or 2,6-diisocyanate, as well as mixtures of aliphatic and/or cycloaliphatic polyisocyanates with aromatic polyisocyanates, in which the aromatic polyisocyanates are preferably present at less than 60 weight % in the mixture.

These polyisocyanates are converted in the manner known in the art into polyisocyanates containing isocyanurate groups and optionally urethane groups, wherein the content of isocyanurate groups should preferably be at least 3 weight %.

2) Compounds containing at least two hydrogen atoms which are reactive to isocyanates and generally having a molecular weight in the range from 62 to 10,000. In addition to compounds containing amino groups, thiol groups or carboxyl groups, these compounds are to be understood as preferably comprising compounds containing hydroxyl groups, particularly compounds containing 2 to 8 hydroxyl groups, especially those having a molecular weight of 100 to 6000, preferably 2000 to 6000, e.g. polyethers and polyesters and/or modified vegetable oils and also polycarbonates and polyester amides containing at least 2, generally 2 to 8, but preferably 2 to 6 hydroxyl groups, such as those which are known in the art for the production of homogeneous and cellular polyurethanes and which are described, for example, in DE-OS 28 32 253, pages 11–18. Preferred polyethers are those based on TMP or sucrose.

Other starting components of this type comprise compounds containing hydroxyl groups and/or amino groups and/or thiol groups and/or carboxyl groups, preferably compounds containing hydroxyl groups and/or amino groups, which are usually employed as chain extenders or crosslinking agents. These compounds generally contain 2 to 8, preferably 2 to 4, hydrogen atoms which are reactive to isocyanates. Examples thereof are described in DE-OS 28 32 253, pages 19–20.

The prepolymers are prepared in the manner known in the art. They generally have an NCO content of 2 to 25 weight %.

Examples of the auxiliary process materials and additives b) contained in the mixture according to the invention include catalysts of the type known in the art, surface-active additives such as emulsifying agents and foam stabilizers, organosilicon foam stabilizers being preferred. They are generally used in an amount of 1–5 weight %, based on the prepolymer a).

plasticizers or cell regulators of the type known in the art, such as paraffins or fatty alcohols or dimethyl polysiloxanes, pigments, colorants, flame retardants of the type known in the art, e.g. tricresyl phosphate, and also stabilizers against the effects of ageing and weathering and optionally substances with a fungistatic and bacteriostatic effect, and fillers.

Examples of these auxiliary process materials and additives are described in DE-OS 27 32 292, pages 21–24.

Other examples of surface-active additives and foam stabilizers, and of cell regulators, reaction retarders, stabilizers, flame retardant substances, plasticizers, colorants and fillers, and of substances with a fungistatic and bacteriostatic effect, which may optionally be used conjointly according to the invention, as well as details of the mode of use and action of these additives, are described in the Kunststoff-Handbuch [*Plastics Handbook*], Volume VII, edited by Vieweg and Höchtlen, Carl Hanser Verlag, Munich 1966, e.g. on pages 103–113.

The following substances may be cited as examples of foaming agents c), which have a boiling point less than 0° C./760 mm Hg and are optionally present in a liquefied and/or gaseous state in the pressure vessel:

tetrafluoroethane, difluoroethane, dimethyl ether, propane, butane, carbon dioxide, nitrous oxide.

The final, hard polyurethane foamed material can be used for filling purposes, e.g. between a window frame and brickwork, for holes in brickwork, and for fixing purposes, e.g. for the installation of door frames.

EXAMPLES

Components I and II, which were premixed for the formation of the prepolymer, were introduced into dry aerosol cans via suitable metering devices.

| | | |
|---|---|---|
| 1. | Component I: | |
| | polyester polyol | 100 g |
| | oxypropylated triethanolamine | |
| | polyether polysiloxane | |
| | tris-(2-chloroisopropyl phosphate) | |
| | N-substituted morpholine | |
| | Component II: | |
| | aliphatic polyisocyanate (NCO content: 4.5 weight %) based on trimerized hexamethylene diisocyanate (isocyanurate content: 5 weight %) | 137 g |
| 2. | Component I: | |
| | tris(2-chloroisopropyl phosphate) | 100 g |
| | polyether polysiloxane | |
| | N-substituted morpholine | |
| | Component II: | |
| | NCO prepolymer (NCO Content: 5 weight %) based on trimerized toluene diisocyanate (isocyanurate content: 7 weight %) and polyether polyols | 325 g |
| 3. | Component I: | |
| | tris(2-chloroisopropyl phosphate) | 100 g |
| | polyether polysiloxane | |
| | N-substituted morpholine | |
| | Component II: | |
| | NCO prepolymer (NCO content: 4.5 weight %) based on trimerized hexamethylene diisocyanate (isocyanurate content: 5 weight %) | 325 g |
| 4 | Component I: | |
| | tris(2-chloroisopropyl phosphate) | 100 g |
| | polyether polysiloxane | |
| | N-substituted morpholine | |
| | Component II: | |
| | NCO prepolymer (NCO content: 4 weight %) based on trimerized isophorone diisocyanate (isocyanurate content: 5 weight %) and polyether polyols | 325 g |
| 5 | Component I: | |
| | tris(2-chloroisopropyl phosphate) | 100 g |
| | polyether polysiloxane | |
| | N-substituted morpholine | |
| | Component II: | |
| | NCO prepolymer (NCO Content: 2 weight %) based on trimerized diphenylmethane diisocyanate (isocyanurate content: 4 weight %) and polyether polyols | 142 g |

Finally, the requisite amount of foaming agent (tetrafluoroethane) was introduced into the cans.

We claim:

1. A mixture comprising:
   a) at least one prepolymer containing isocyanate groups and a monomer content of less than 2% by weight, wherein said prepolymer comprises the reaction product of
      i) at least one polyisocyanate containing isocyanurate groups and, optionally, urethane groups, with
      ii) at least one compound having at least two reactive hydrogen atoms and having a molecular weight of 62 to 10,000;
   b) additives and/or auxiliary agents, and
   c) at least one foaming agent having a boiling point of less than 0° C. at 760 mm Hg.

2. The mixture of claim 1, wherein i) said polyisocyanate containing isocyanurate groups and, optionally, urethane groups, has an isocyanurate group content of at least 3% by weight.

3. The mixture of claim 1, wherein i) said polyisocyanate containing isocyanurate groups and, optionally, urethane groups, is selected from the group consisting of aliphatic polyisocyanates, cycloaliphatic polyisocyanates and mixtures thereof.

4. The mixture of claim 1, wherein i) said polyisocyanate containing isocyanurate groups and, optionally, urethane groups, comprises isophorone diisocyanate.

5. The mixture of claim 1, wherein i) said polyisocyanate containing isocyanurate groups and, optionally, urethane groups, comprises hexamethylene diisocyanate.

6. The mixture of claim 1, wherein i) said polyisocyanate containing isocyanurate groups and, optionally, urethane groups, comprises a mixture of an aliphatic polyisocyanate and an aromatic polyisocyanate.

7. The mixture of claim 1, wherein i) said polyisocyanate containing isocyanurate groups and, optionally, urethane groups, comprises a toluene diisocyanate having an isocyanurate group content of at least 3% by weight.

8. The mixture of claim 1, wherein said c) foaming agent is selected from the group consisting of tetrafluoroethane, difluoroethane, dimethylether, propane, butane, carbon dioxide, nitrous oxide and mixtures thereof.

9. A hard polyurethane foamed material produced by curing the mixture of claim 1 with moisture, after said mixture emerges from a pressure vessel.

10. A hard polyurethane foamed material produced by reacting the mixture of claim 1, with d) at least one compound containing reactive hydrogen atoms and having a molecular weight of from 18 to 6,000.

* * * * *